J. B. NEIL.
COTTON PICKING MACHINE.
APPLICATION FILED MAR. 19, 1917.

1,323,089.

Patented Nov. 25, 1919.
12 SHEETS—SHEET 4.

Witnesses

Inventor,
J. B. Neil
by C. A. Snow & Co.
Attorneys.

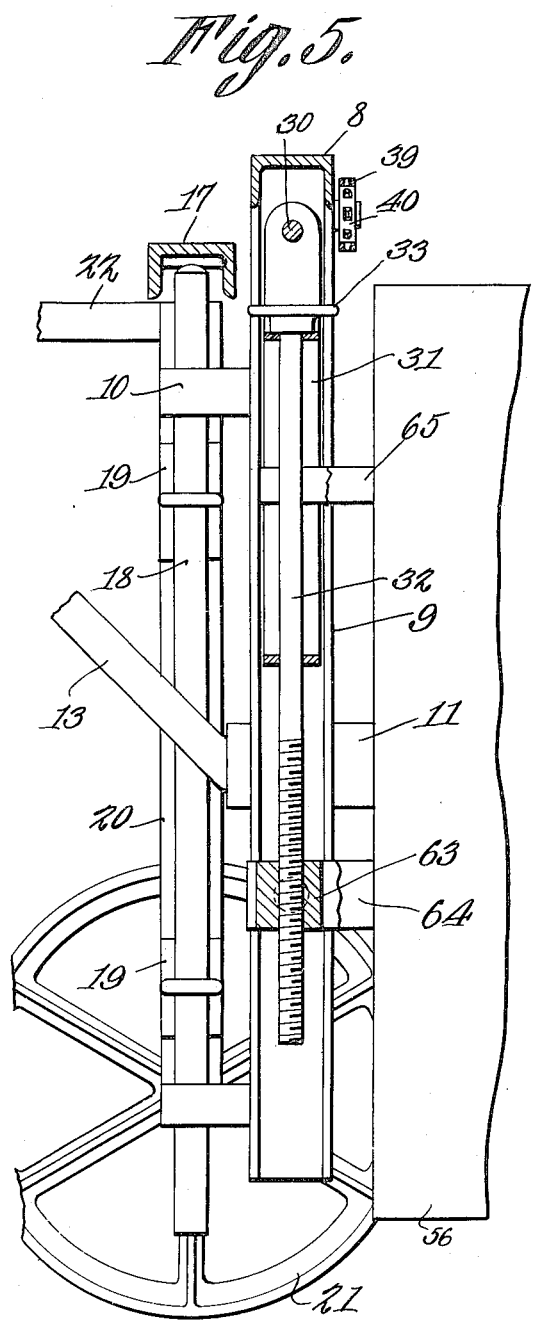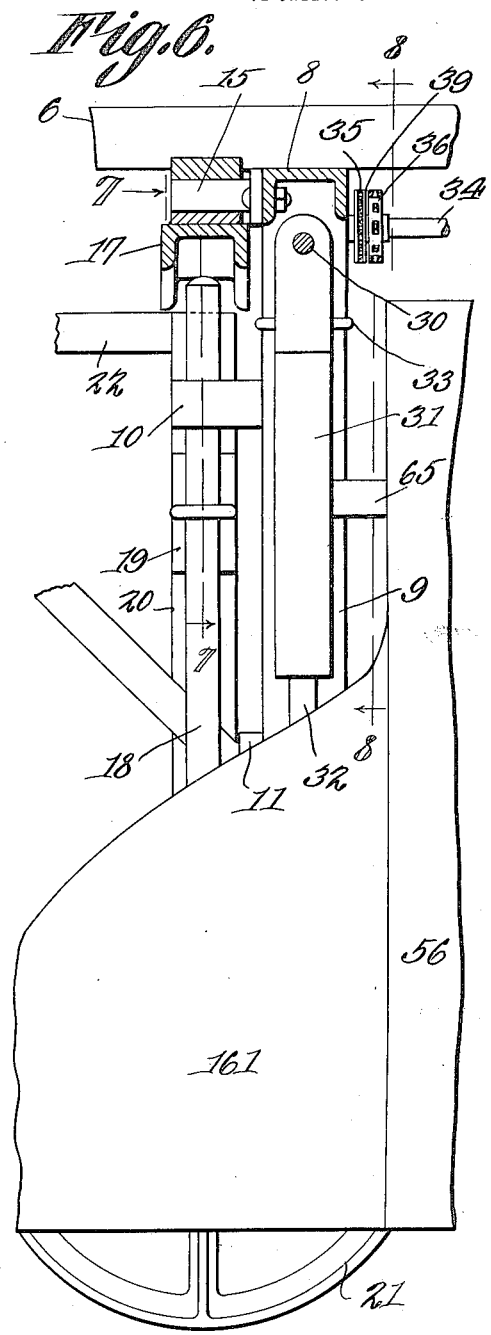

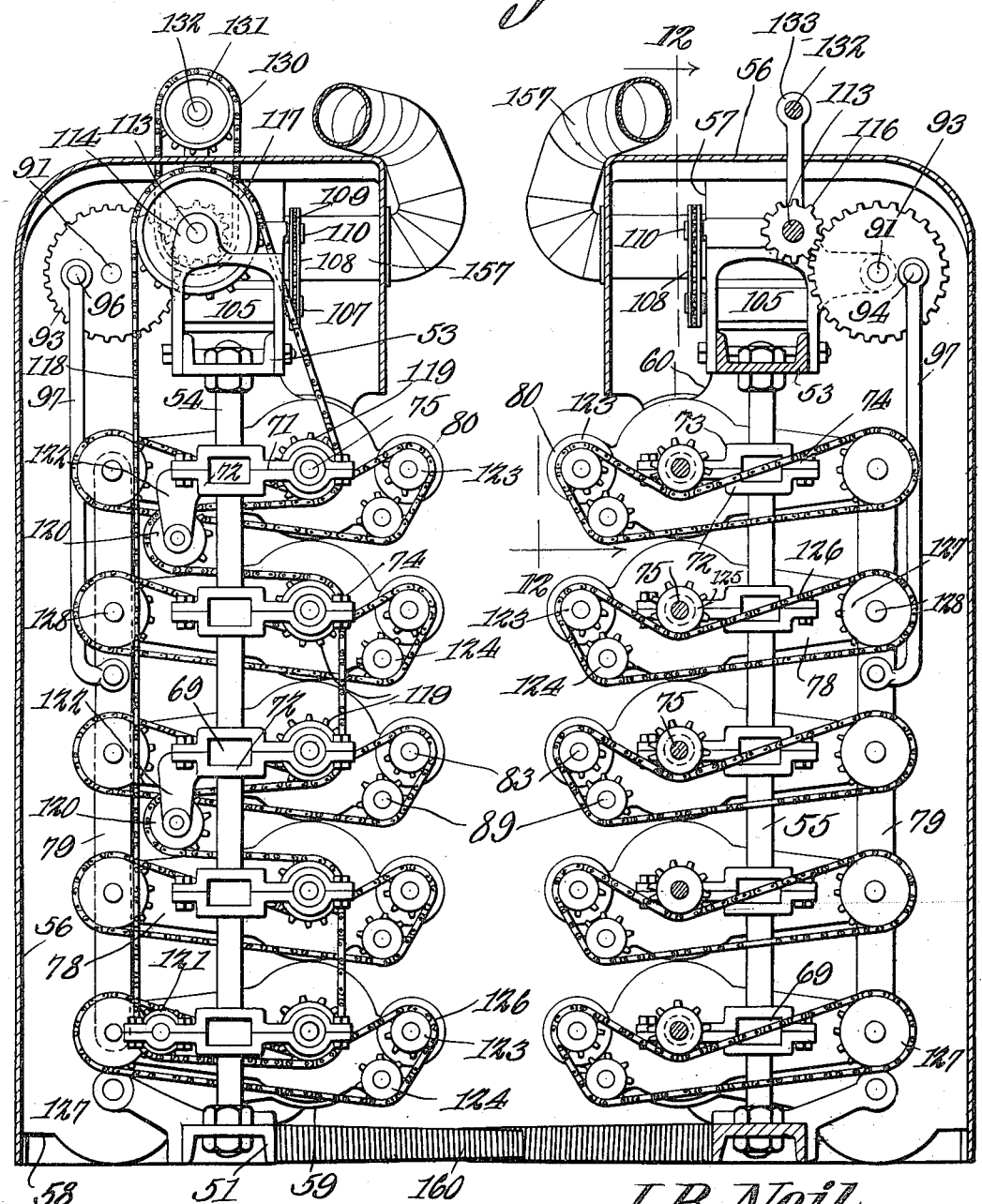

J. B. NEIL.
COTTON PICKING MACHINE.
APPLICATION FILED MAR. 19, 1917.

1,323,089.

Patented Nov. 25, 1919.
12 SHEETS—SHEET 9.

J. B. NEIL.
COTTON PICKING MACHINE.
APPLICATION FILED MAR. 19, 1917.
1,323,089.
Patented Nov. 25, 1919.
12 SHEETS—SHEET 10.
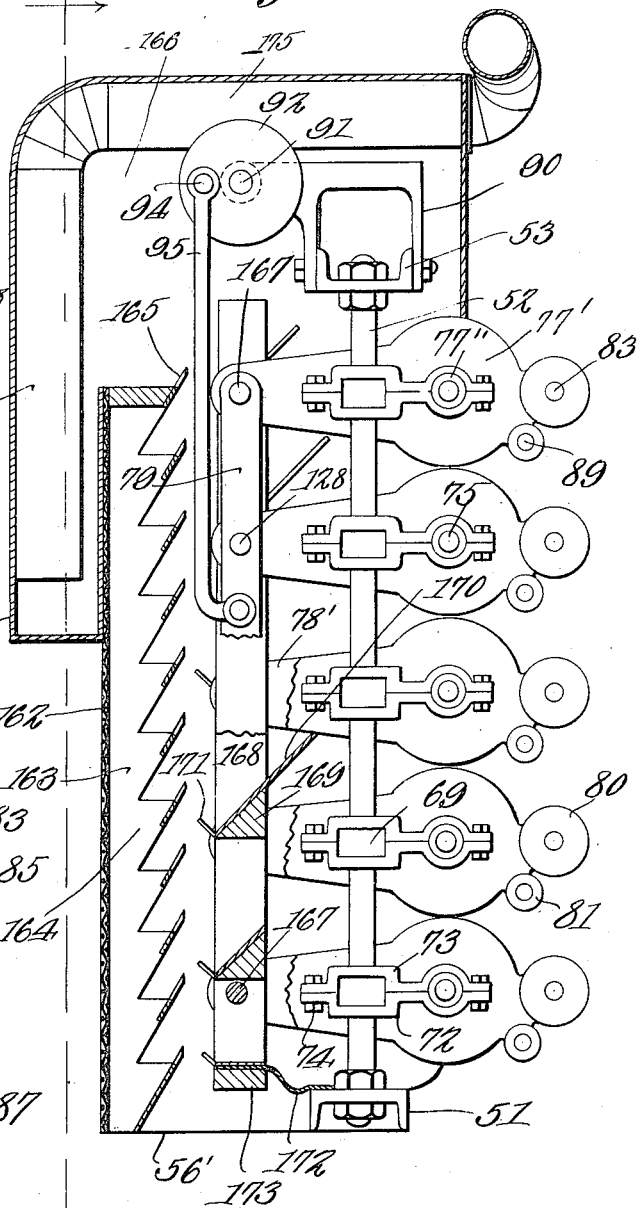
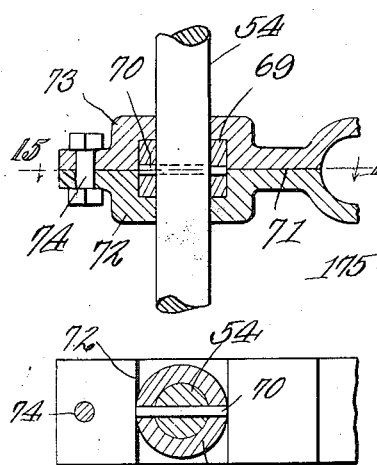
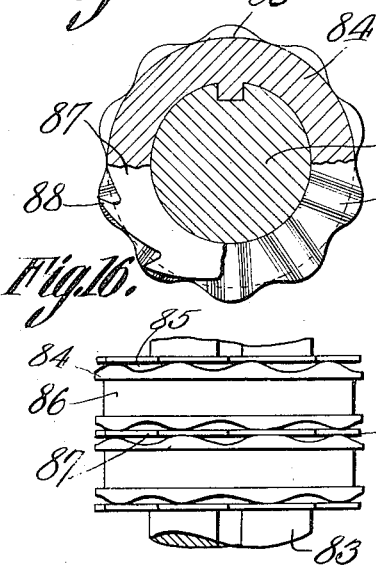
Witnesses
J. B. Neil, Inventor
Attorneys J. B. NEIL.
COTTON PICKING MACHINE.
APPLICATION FILED MAR. 19, 1917.
1,323,089.
Patented Nov. 25, 1919.
12 SHEETS—SHEET 11.
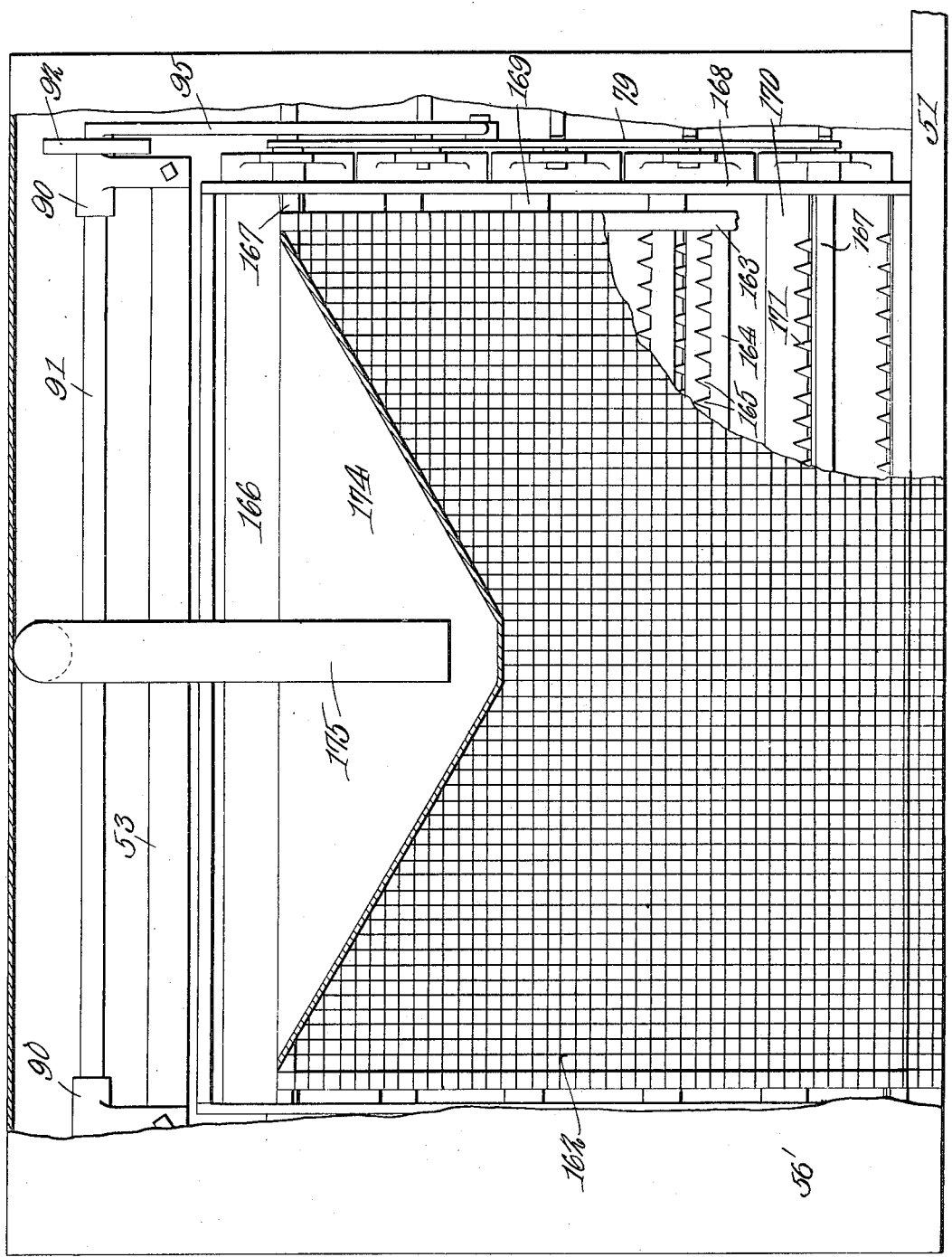

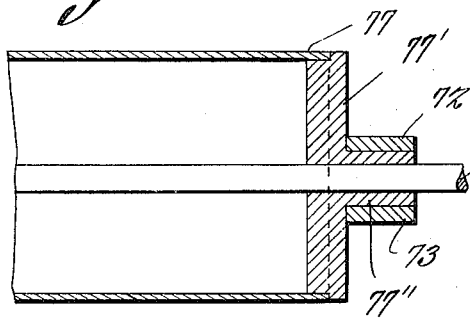
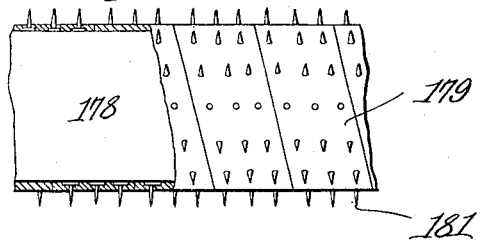
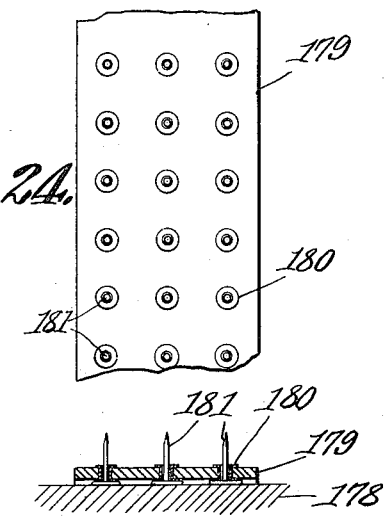

UNITED STATES PATENT OFFICE.

JOSEPH B. NEIL, OF FILBERT, SOUTH CAROLINA.

COTTON-PICKING MACHINE.

1,323,089.  Specification of Letters Patent.  Patented Nov. 25, 1919.

Application filed March 19, 1917. Serial No. 155,813.

*To all whom it may concern:*

Be it known that I, JOSEPH B. NEIL, a citizen of the United States, residing at Filbert, in the county of York and State of South Carolina, have invented a new and useful Cotton-Picking Machine, of which the following is a specification.

This invention relates to machines for picking cotton and is designed more particularly as an improvement upon the structure disclosed in Patent 1,252,016, dated January 1, 1918.

One of the objects of the invention is to provide a machine which can either be pulled along the rows of cotton plants or can be propelled under its own power and which machine will at all times bear firmly on the ground irrespective of any irregularities in contour, so that the picking units forming a part of the machine will always be firmly held against the plants on which they are operating.

Another object is to provide a cotton picking machine utilizing opposed series of picking units, simple and efficient means being employed whereby either or both ends of each series can be raised or lowered relative to the adjoining portions of the structure, thus to adapt the machine to the plants to be operated on.

Another object is to provide simple and compact means constantly under the control of the operator, by means of which either or both ends of the picking units can be moved inwardly toward the center of the machine or outwardly away therefrom.

A still further object is to simplify the construction of the frames of the picking units whereby they are reduced in weight without sacrificing strength and whereby the various parts of the structure can be assembled readily.

Another object is to provide improved means for taking care of the cotton as it is removed from the plants, all of the cotton being conducted to an outlet flue where it may be directed into baskets or other containers provided therefor, the mechanism for this purpose being simple, compact and efficient.

A further object is to improve upon the construction of the picking rolls whereby positive engagement of the cotton fiber is insured while the twigs, leaves and other undesirable material will be left clear so that few if any foreign substances enter the machine with the cotton fiber.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

In said drawings:—

Fig. 5 is an enlarged section through the front portion of the machine, said section being taken on the line 5—5 Fig. 3, parts being broken away.

Fig. 6 is an enlarged section through the front portion of the machine, said section being taken on the line 6—6 Fig. 3.

Fig. 7 is a section through one side portion of the machine on line 7—7 Fig. 6, the spindle and the parts attached thereto being shown in elevation.

Fig. 9 is an enlarged front elevation of the series of picking units and adjacent parts, the housings being shown in section.

Fig. 14 is a vertical section through one of the swinging bearings of a picking unit, a portion of the rod or frame member being shown in elevation.

Fig. 15 is a section on line 15—15 Fig. 14.

Fig. 16 is a view partly in section and partly in elevation of one of the elements of a picking roll.

Fig. 17 is an enlarged plan view of a portion of a picking roll.

Fig. 18 is a vertical transverse section through a portion of a modified form of machine in which the cotton is removed by mechanism different from that disclosed in Figs. 1 to 14 inclusive.

Fig. 19 is a section on line 19—19 Fig. 18, the suction flue being shown in elevation.

Fig. 20 is a detail view showing the connection between the draft tongue and the machine.

Fig. 21 is a plan view of the structure shown in Fig. 20.

Fig. 22 is a section through one end portion of one of the tubular members or housings and showing the construction of the bearing provided at said end.

Fig. 23 is a view partly in elevation and partly in section of a portion of a modified form of doffing member.

Fig. 24 is a detail view of one of the strips used in the construction of the doffing member shown in Fig. 23.

Fig. 25 is an enlarged section through a portion of said modified form of doffing member.

Fig. 26 is a view partly in section and partly in elevation of the front portion of a modified form of machine in which the steering is done from the rear portion, this machine being of a type driven by its own power.

Figure 1:
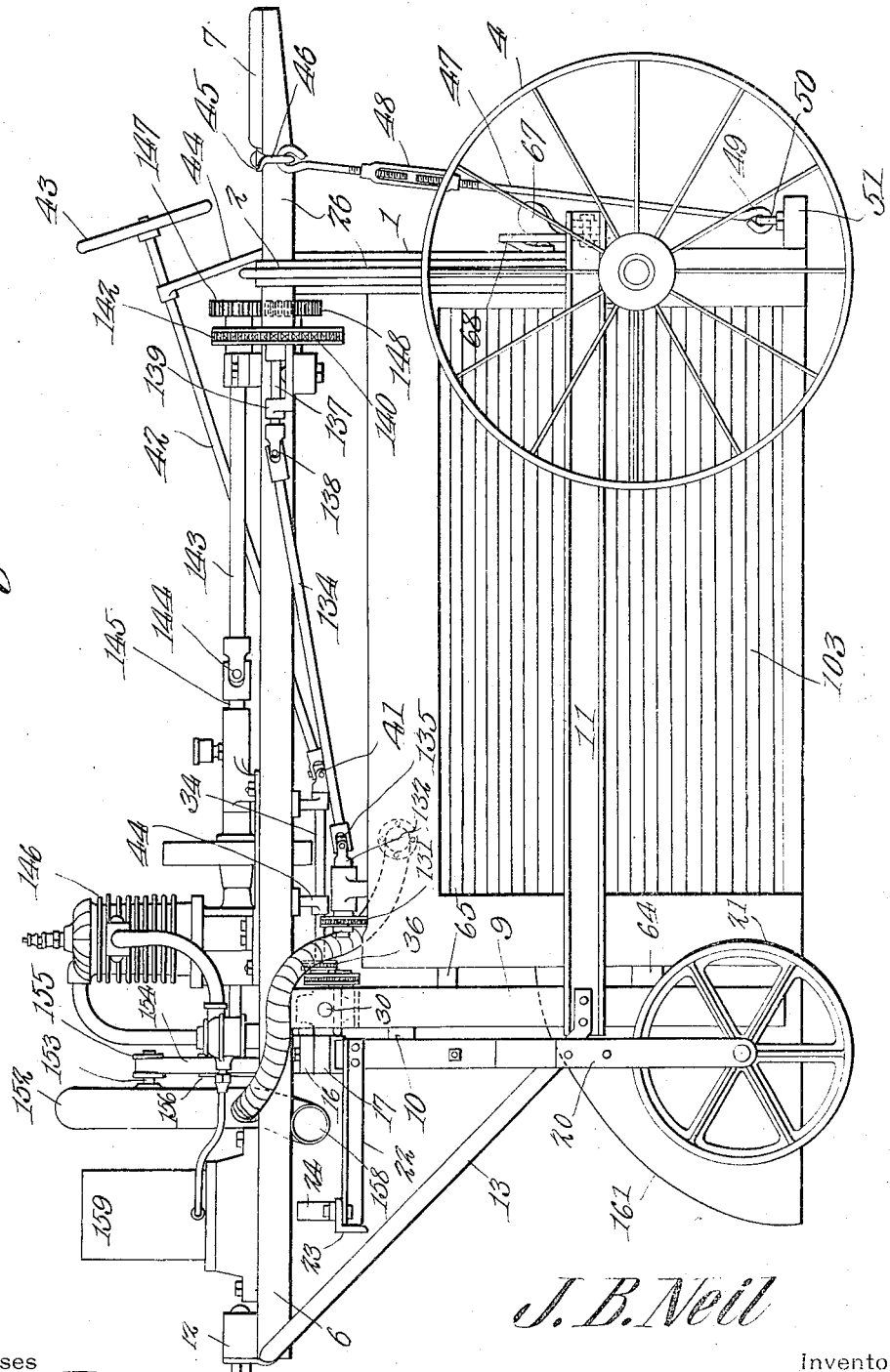
Figure 1 is a side elevation of the machine.

Referring to the figures by characters of reference 1 and 2 designate inner and outer arched members spaced apart along their upper portions but secured together at their sides to form the rear axle of the machine, there being spindles 3 projecting laterally from the lower portion of this rear axle and engaged by the rear supporting wheels 4. The upper portions of the inner and outer members of the rear axle may be held together by spacing blocks 5 secured thereto and extending between and secured to these upper portions of the rear axle are beams 6 which project rearwardly beyond the axle to support a seat 7. These beams preferably diverge forwardly and are secured to the top portion of an arch 8 the sides of which are parallel as indicated at 9. Extending forwardly from the sides 9 of arch 8 are blocks 10 and connecting the side portions of the rear axle to the sides 9 are side beams 11. A cross beam 12 is secured upon the front ends of the longitudinal beams 6 where they project forwardly beyond the arch 8 and braces 13 connect the ends of the cross beam 12 to the front ends of the side beams 11. Additional braces 14 may be used for bracing the sides 9, these braces being attached not only to said sides 9 but also to the middle portion of the arch 8.

Secured to the arch 8 is a stud 15 which projects into a bearing 16 secured upon the middle portion of an equalizing bar 17 which is preferably formed of a channeled strip. This equalizing bar is inclined toward its ends from the center thereof and the end portions of the equalizing bar straddle and bear downwardly upon the rounded upper ends of spindles 18 which are parallel with the sides 9 of the arch 8 and are slidably mounted within the blocks 10.

To each of the spindles 18 are secured blocks 19 designed to rotate and slide with the spindle and attached to the blocks on each spindle is a forked member 20 in which is journaled a front wheel 21. Fixedly attached to and extending forwardly from the upper end of each of these forked members 20 is an arm 22 and the forward ends of these arms are pivotally connected to the ends of a connecting bar 23 whereby the two arms 22 will be maintained parallel and will swing in unison. A retaining strap 24 may be mounted on the middle portion of the connecting bar 23 and, as shown in Fig. 21, a draft tongue 25 may be extended under this strap, the back end of this tongue being pivotally connected, as at 26, to a bracket 27 attached to the middle portion of the arch 8. Tongue 25 may be formed with a longitudinal slot 28 and a bolt 29 may be extended through this slot and through the bracket 24 and into the connecting bar 23. Thus it will be seen that when the draft tongue is swung toward the left, motion will be transmitted therefrom through bolt 29 to the connecting bar or strip 23 with the result that the wheels 21 will be swung about the axes of the spindles 18, thus to cause the machine to turn toward the left. When the tongue is swung toward the right, the wheels 21 will also be swung toward the right.

Obviously instead of providing a draft tongue for use in coupling draft animals to the machine, a motor may be used for propelling the machine, it being within the province of any skilled mechanic to provide mechanism whereby motion will be transmitted to the rear wheels of the machine from a motor.

Arranged under and parallel with the upper portion of the arch 8 and with its ends fixedly mounted in the sides of the arch is a guide rod 30 and mounted to slide on this rod are spaced hangers 31 supporting adjusting screws 32. Each screw is preferably provided with an enlarged head 33 which can be used as a hand wheel and the lower ends of the screws are threaded.

A short longitudinal shaft 34 is journaled back of the middle portion of the arch 8 and has sprockets 35 and 36 adapted to rotate therewith. The sprocket 36 is engaged by an endless chain 37 which extends to a sprocket 38 mounted loosely at one side of the arch 8. The sprocket 35 is engaged by a chain 39 which extends in the opposite direction from the shaft 34 and is mounted on a sprocket 40 arranged at the other side of the arch. One of the hangers 31 is attached to the upper flight of chain 37, while the other hanger 31 is attached to the lower flight of chain 39. Thus it will be seen that when the shaft 34 is rotated in one direction, the two chains 37 and 39 will be operated simultaneously and while the upper flight of chain 37 is drawing its hanger inwardly toward the shaft 34, the lower flight of the chain 39 will draw its hanger inwardly toward the shaft 34. In other words, the two hangers will be simultaneously adjusted toward or from each other when the shaft 34 is rotated.

Shaft 34 is connected by a universal joint 41 to a shaft 42 extending upwardly and rearwardly to a hand wheel 43 located where it can be conveniently reached by the occupant of the seat 7. Suitable bearings for the shafts 34 and 42 are provided as indicated at 44.

Figure 11:
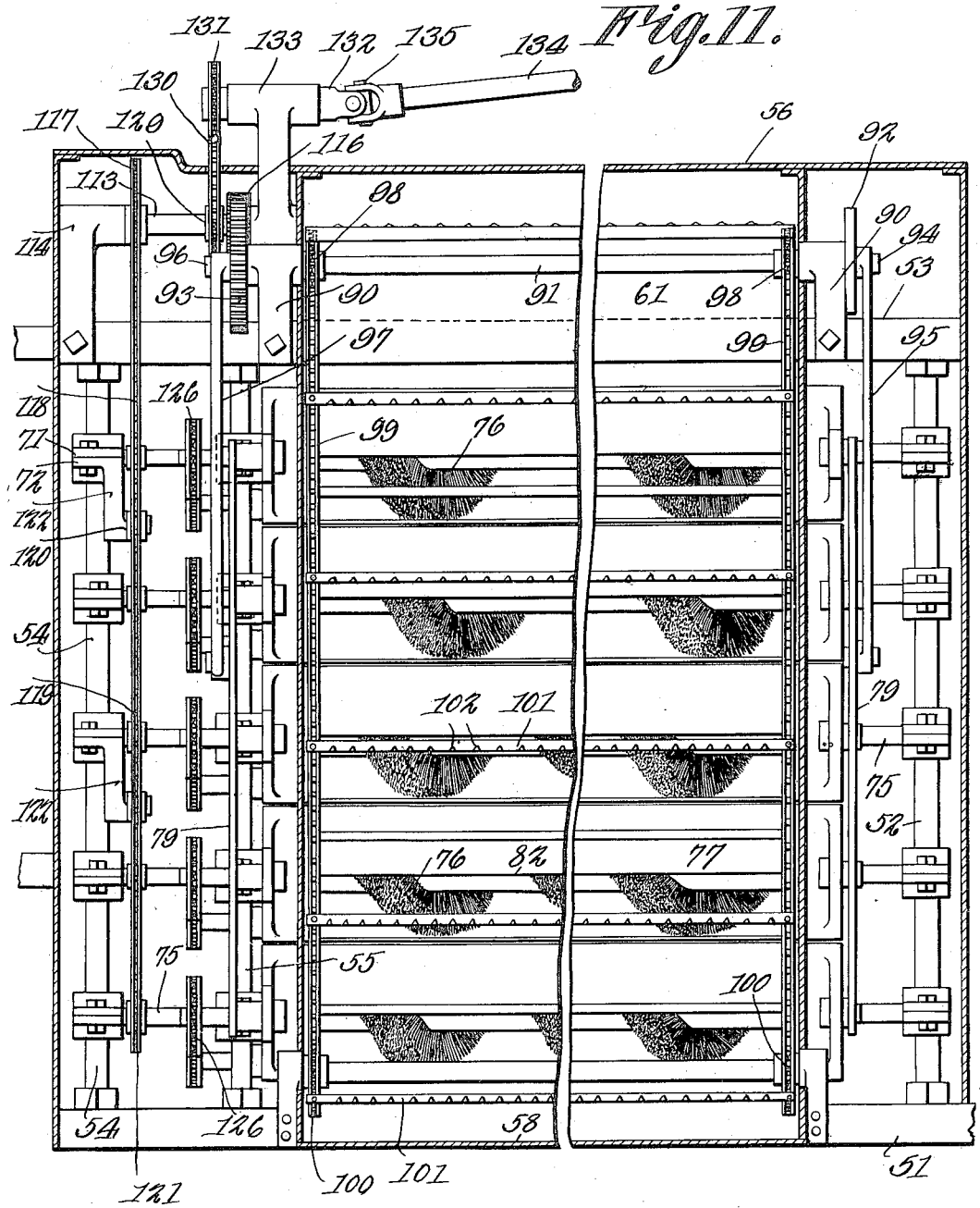
Fig. 11 is a vertical longitudinal section through the housing of one of the series of picking units and showing the mechanism therein in elevation, said section being taken on the line 11—11 Fig. 10.
Figure 12:
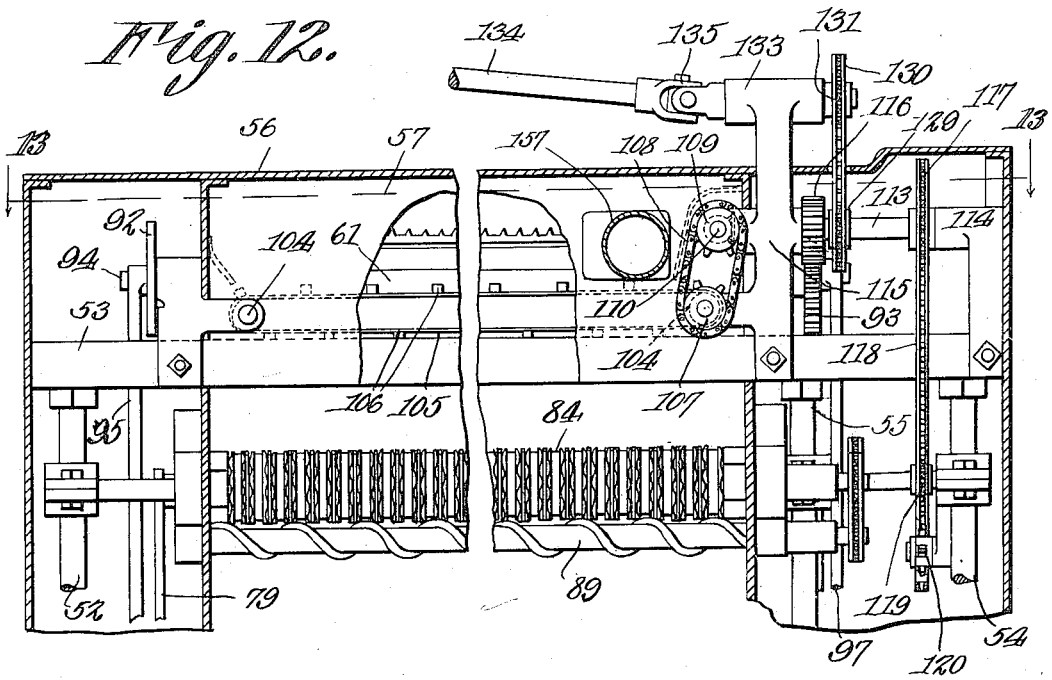
Fig. 12 is a section on line 12—12 Fig. 9.
Figure 13:
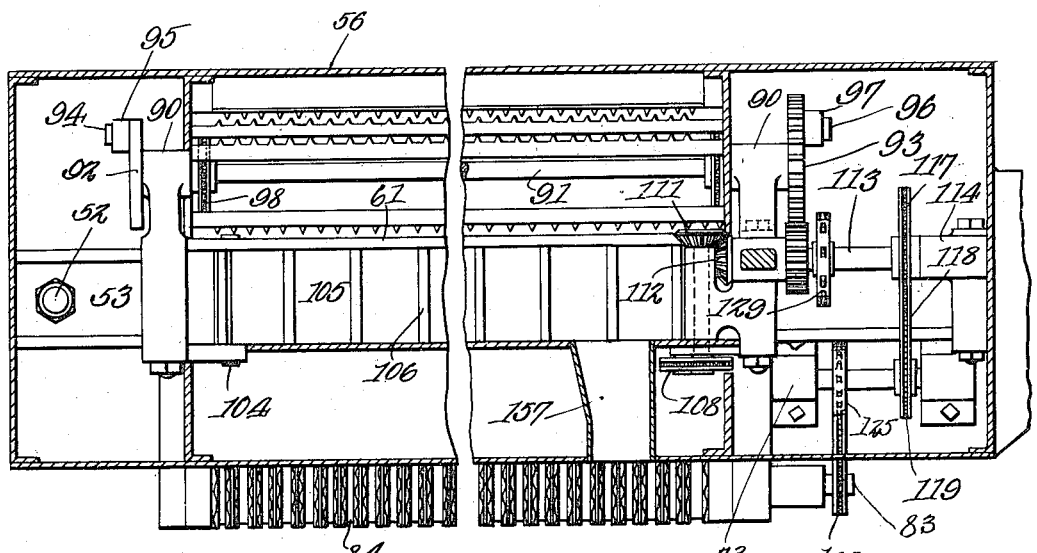
Fig. 13 is a section on line 13—13 Fig. 12.

Secured upon the longitudinal beams 6 close to the seat 7 is a cross bar 45 having depending eyes 46 to which are secured the upper ends of hangers 47. Each hanger is made up of screw threaded rods connected by a turn buckle 48 and the lower ends of the hangers are provided with eyes 49 engaging in eyes 50 upstanding from the rear ends of channel beams 51. Each channel beam 51 constitutes the lower member of a frame for holding a series of picking units Fastened to the rear portion of each of these channel beams 51 is a rod 52 extending at right angles to the beam 51 and secured at its upper end to the rear end of a top beam 53 which is likewise a channel, as shown particularly in Figs. 9 and 11. Fixedly secured to and extending upwardly at right angles from the front portion of the beam 51 are parallel rods 54 and 55, the upper ends of which are secured to the front portion of the top beam 53. The two beams 51 and 53 and the rods 52, 54 and 55 make up a rigid frame which, as before pointed out, is designed to hold a series of picking units.

A housing 56 preferably formed of sheet metal and closed at its top, outer side and ends, is secured to the beams 51 and 53 so as inclose said beams and the rods 52, 54 and 55. An apron 57 extends downwardly from the inner side of the top of the housing and is secured along the inner side of the top channel beam 53 while extending inwardly from the outer side of the housing 56 is an inclined bottom 58 which extends over the bottom beam 51 and inwardly therebeyond, terminating in a transversely concaved flange 59 designed to fit snugly against the lower picking unit hereinafter described. The apron 57 is likewise provided with a downwardly and inwardly extending flange 60 adapted to fit snugly against the uppermost picking unit of a series, as hereinafter pointed out.

The depending apron 57 forms one side of a longitudinal trough, the bottom of which is formed by the channel beam 53. The inner side of the trough is formed by an elongated plate 61 attached to the inner side of the channel beam 53. The upper edge portion of the plate 61 can be curved outwardly as indicated at 62 for the purpose hereinafter set forth.

The space between the flanges 59 and 60 of the housing is open and adapted to contain the series of picking units hereinafter described.

Obviously the rear end of each of the housings 56 and the parts contained therein will be supported by the hanger 47 connected to the beam 51 thereof. The front end of each housing is supported by one of the screws 32 the threaded portion of which extends through and engages a block 63 which is connected to an outstanding block 64 on the front end of the housing 56 near the bottom thereof, this block 63 being adapted to rock about a transverse axis. A forked member 65 is extended forwardly from the upper portion of the housing 56 and straddles and is adapted to slide on the upper portion of the screw 32. Thus the front end of each housing 56 will be properly supported and said end can be raised or lowered by rotating the screw 32 by means of the hand wheel 33. The rear end of each housing 56 can likewise be raised or lowered by manipulating the turn buckle 48.

As the supporting screws 32 are mounted within the slidable hangers 31 it will be obvious that when these hangers are shifted toward or from each other, the housings 56 and the picking units carried thereby will be correspondingly moved.

Figure 4:
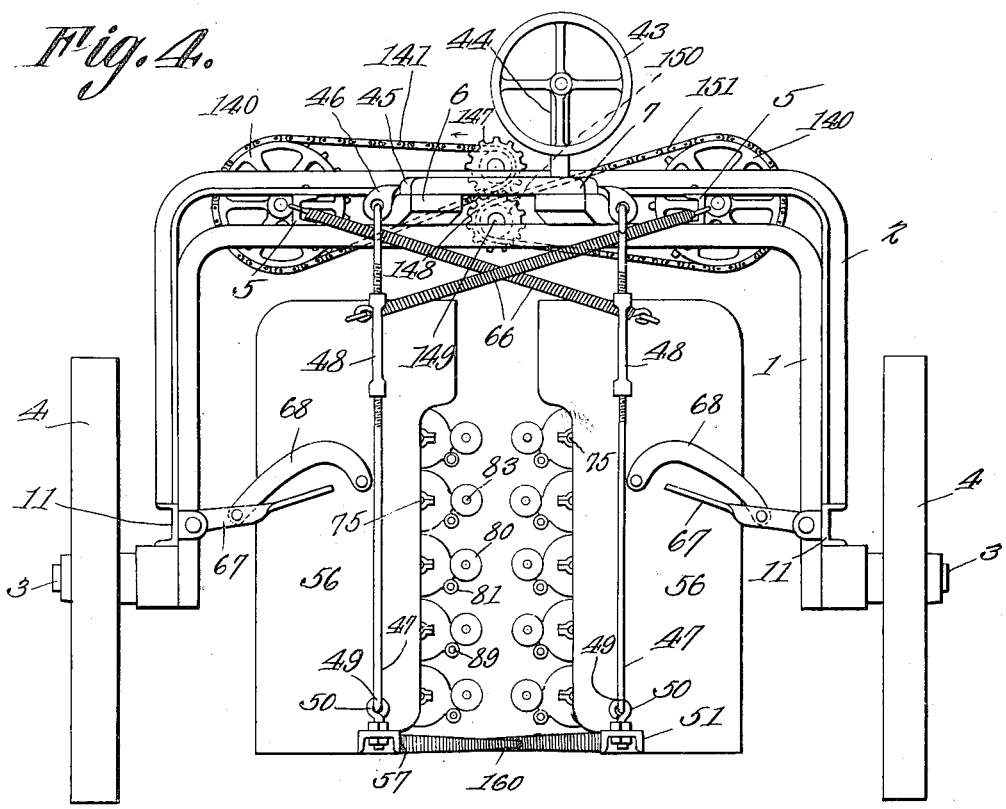
Fig. 4 is a rear elevation.
Figure 8:
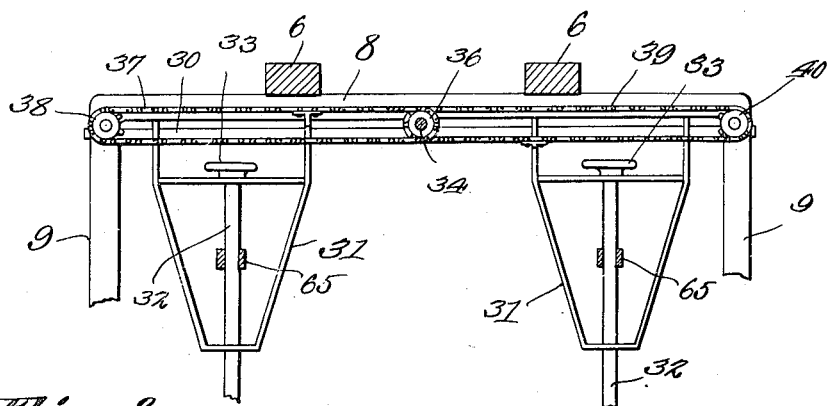
Fig. 8 is a section on a reduced scale taken on line 8—8 Fig. 6.

The rear ends of the housings 56 can be adjusted toward or from each other by special mechanism provided for that purpose. By referring particularly to Fig. 4 it will be noted that the two housings 56 are connected to coiled springs 66 which are crossed and are attached preferably to the spacing blocks 5. These springs therefore serve to hold the rear portions of the housings 56 drawn yieldingly toward each other. Foot levers 67 are pivotally connected to the sides of the rear axle and arched links 68 connect these levers to the rear portions of the housings 56. Thus by pushing downwardly with the feet on the inner ends of the levers 67, the links 68 can be caused to pull outwardly upon the housings 56, thereby to increase the distance between the rear ends of the two housings. When the foot levers are released, springs 66 will automatically return the housings 56 to their normal positions. The foot levers 67 are located where they can be conveniently reached by the feet of the person occupying the seat 7. Thus as the hand wheel 43 is also within convenient reach of the operator, the lateral adjustment of the two housings 56 at their front and rear ends can be quickly and easily effected.

Secured on each of the rods 52, 54 and 55 are collars 69, which, as shown in Fig. 15, may be held on their supporting rods by pins 70 extending diametrically through the collars and through the rods. Mounted to swing horizontally upon each of the rods 52, 54 and 55 are bearing brackets 71 each consisting of a lower member 72 and an upper member 73. The two members are offset between their ends so as to fit snugly around or straddle the opposed faces of the collar interposed therebetween and said members may be held together by bolts 74 or in any other suitable manner. Thus the bearing can be readily assembled on the rods and will be free to swing horizontally thereon although being held against up and downward movement along the rods by the collars 69.

The bearing brackets 71 support parallel shafts 75 extending from one end to the other of the housing and on each of these shafts and between the rods 52 and 55 is arranged the doffing brush 76 of one picking unit. This brush is preferably spiral as shown particularly in Fig. 11 and works snugly within a cylindrical tube 77 which is concentric with the shaft 75 and is closed at each end by a head 77' having a tubular bearing extension 77". The extensions 77' are journaled within the bearings 71 and the shaft 25 bears within these tensions 77" are journaled within the bearFig. 22. Arms 78 project outwardly from both ends of each tube 77 and in the direction of the outer side of the housing 56 in which the picking units are mounted and the free ends of these arms 78 are all connected by an upwardly extending bar 79 so that when this bar is raised and lowered the arms 78 will be simultaneously actuated and all of the tubular members 77 rotated in unison.

Formed in that portion of each tubular member 77 which projects outwardly from the housing 56 is an inlet slot 79' and the ends of each tubular member 77 project beyond the ends of this slot to form ears 80 and 81. An outlet opening 82 is formed in the upper half of that portion of the tubular member 77 which projects into the housing 56.

The ears 80 of each tubular member 77 constitute bearings for a shaft 83 on which are keyed the members constituting the active portions of the picking roll. By referring particularly to Figs. 16 and 17 it will be noted that the picking roller is made up of a plurality of disks 84 each of which is formed in its sides with radial corrugations 85 while an annular groove 86 of uniform depth is formed in the periphery of the disk. Interposed between the disks are rings 87 having saw teeth 88, the greatest diameter of each of the toothed rings 87 being the same as the greatest diameter of each of the disks 84 and all of the teeth on each of the rings 87 being arranged between the matching radial grooves in the adjoining disks 84. Thus it will be seen that when the disks are clamped tightly together on the shaft 83 and keyed thereto, each tooth 88 will be arranged between two radial grooves in the disks 84 and it therefore becomes possible for cotton fiber to press back into the grooves 85 and thus insure engagement of the fiber by the teeth 88.

A spiral roller 89 is arranged in front of the lower portion of the opening 79 in the tubular member 77 and close to and under the picking roller, this spiral roller 89 being journaled in the ears 81. The roller is so pitched and timed that it will tend to press backwardly against plants engaged by the picking units thus to counteract the forward movement of the machine. The spiral will also act to expel leaves, twigs, burs, etc., in the same manner as the spiral roll disclosed in my application hereinbefore mentioned. It will be noted, however, that in the present structure the spiral repelling roll is arranged under the picking roll instead of above it. This arrangement has been found advantageous under some conditions. It will be noted furthermore that the tubular members 77 are supported close together, the upper and lower members being engaged by the flanges 60 and 59 respectively. Consequently it becomes impossible for trash to work back into the housing 56 between the tubular members 77 or between the upper and lower members 77 and those portions of the housing contacting therewith.

Brackets 90 are secured to the upper beam 53 in each housing and journaled in these brackets is a longitudinal shaft 91 to one end of which is secured a disk 92, while to its other end is secured a gear 93. Disk 92 has a wrist pin 94 connected by a pitman 95 to one of the connecting bars 79 while another wrist pin 96 is provided on the gear 93 and is connected by a pitman 97 to the other connecting bar 79. Thus it will be seen that when shaft 91 is rotated the arms 78 will be oscillated and all of the tubular members 77 controlled thereby will be rotated in unison. As the picking and spiral rolls are located inwardly beyond the shaft 75, the rotation of the tubular members 77 will result in upward and downward swinging movement of the picking and spiral rolls.

Sprockets 98 are secured to the shaft 91 and are engaged by endless chains 99 which extend downwardly within the housing 56 to sprockets 100 journaled within the front and back ends of the housing 56 close to the bottom thereof. These chains 99 are connected by cross strips 101 on which are arranged spurs 102. Those flights of the chains nearest the outer side of the housing 56 move upwardly and the spurs 102 are inclined upwardly and outwardly and are adapted to work close to the points of teeth 103 extending from vertical bars 104 secured to and extending throughout the height of the outer wall of the housing 56.

Arranged within the end portions of the trough made up of the channel beam 53, apron 57 and plate 61 are rollers 104 on which is mounted an endless conveyer belt 105 which may if desired have transverse cleats 106 thereon. One of the rollers has a sprocket 107 attached thereto so as to rotate therewith and this sprocket is adapted to receive motion through a chain 108 from another sprocket 109 attached to a short transverse shaft 110. This shaft is provided at one end with a bevel gear 111 constantly meshing with another bevel gear 112 secured to one end of a longitudinal counter shaft 113 journaled in bearings 114 and 115 supported by the beam 53 near the front end thereof. This counter shaft 113 is provided with a small gear 116 constantly meshing with the gear 93 so that power is thus distributed from the counter shaft 113 to the elevator 99 and the picker unit oscillating mechanism, driven by the shaft 91, and to the horizontal conveyer driven from the shaft 110.

The shaft 113 also constitutes means for operating the various picker units. On this shaft 113 is secured a sprocket 117 on which is mounted an endless chain 118. One flight of the chain extends from sprocket 117 downwardly under and in engagement with a sprocket 119 secured to the shaft 75 of the upper picker unit and from this sprocket said chain extends partly around an idler sprocket 120 and thence into engagement with the sprockets 119 of the next two picker units. Said chain then extends partly around another idler sprocket 120 and thence downwardly into engagement with the sprockets 119 of the next two picker units. From the lowermost sprocket 119 the chain extends under an idler sprocket 121 and thence upwardly to the sprocket 117. Thus it will be seen that when shaft 113 is rotated motion will be transmitted therefrom to all of the shafts 75 of the series of picker units arranged below said shaft 113 and these shafts 75 will all be rotated in the same direction. As shown particularly in Fig. 9, the idler sprockets 120 can be carried by brackets 122 formed with or secured to the lower members 72 of certain of the bearing elements 71.

The shaft 83 of the picking roll of each picker unit has a sprocket 123 and secured to the spiral roller 89 is another sprocket 124. A sprocket 125 is attached to each shaft 75. An endless chain 126 engages the sprocket 125 and also engages the sprockets 123 and 124 of the same unit and an idler sprocket 127 is mounted on the adjacent arm 78 of the unit and bears on the pivotal connection 128 between the bars 79 and the arms 78. Thus it will be seen that when the shaft 75 of each picker unit is actuated by the chain 118, as hereinbefore pointed out, the sprocket 125 on said shaft will transmit motion through the chain 126 to the sprockets 123 and 124 so that the picking roller and the spiral roller will both be actuated simultaneously with the doffing brush.

Secured to the shaft 113 is a sprocket 129 and this sprocket is adapted to receive motion through a chain 130 from a sprocket 131 secured to a short shaft 132 journaled in a bearing 133 which constitutes an extension of the bearing 90 and projects through the top of the housing 56. A drive shaft 134 is connected to the short shaft 132 by a universal joint 135 and is inclined upwardly to another short shaft 137 to which it is connected by a universal joint 138. The shaft 137 is journaled in bearings 139 supported by a cross beam 140 which is secured to and projects laterally beyond the beams 6. Obviously one of the shafts 137 and 134 and 132 is provided for each series of picking units, the universal connections between the shaft sections permitting the housings 56 and the parts carried thereby to be shifted laterally, upwardly and downwardly without disconnecting the drive between the picker units and the shafts 137.

Secured to each of the shafts 137 is a sprocket 140. A chain 141 engages one of these sprockets and receives motion from a sprocket 142 secured to a main drive shaft 143 connected by a universal joint 144, to the drive shaft 145 of an engine 146 mounted preferably on the front portion of the machine and supported by the beams 6. A gear 147 is secured to shaft 143 and transmits motion through a gear 148 to a short shaft 149. A sprocket 150 is secured to shaft 149 and transmits motion through a chain 151 to the other sprocket 140.

Mounted at any suitable point on the machine is a fan casing 152 and the shaft 153 of the fan is adapted to be driven by a belt 154 or in any other suitable manner, said belt engaging a pulley 155 on the shaft 153 and also engaging a pulley 156 on the engine shaft. Flexible tubes 157 extend to the intake of the fan casing 152 and into the housings 56, each of these flexible tubes opening into one of the troughs in which the horizontal conveyers 105 are mounted, the said tubes opening into the troughs adjacent those ends thereof toward which the cotton is carried by the conveyers 105. The fan casing has an outlet tube 158 and when the fan within the casing and which can be of any desired construction, is actuated, it will expel a blast of air through this outlet 158 and set up a suction through the two tubes 157 so that cotton delivered by the conveyers 105 to the front ends of the troughs in which said conveyers are located, will be sucked into the tubes 157 and delivered through the outlet tube 158 into baskets or other suitable containers provided therefor.

A fuel tank 159 may be mounted on the beams 6 and adjacent the engine.

Spring fingers, which can be made of coiled springs and which have been indicated at 160 can be extended inwardly from the bottom beams 51 of the two housings 56 and if desired these spring fingers can be disposed in staggered relation and can lap. The said fingers are designed to depress weeds which may enter between the opposed series of picking units so that they will be held away from said units while the cotton is being acted on. As the cotton plants are comparatively stiff, they will not be depressed by these light spring fingers, but only the weeds will be affected thereby.

Figure 10:
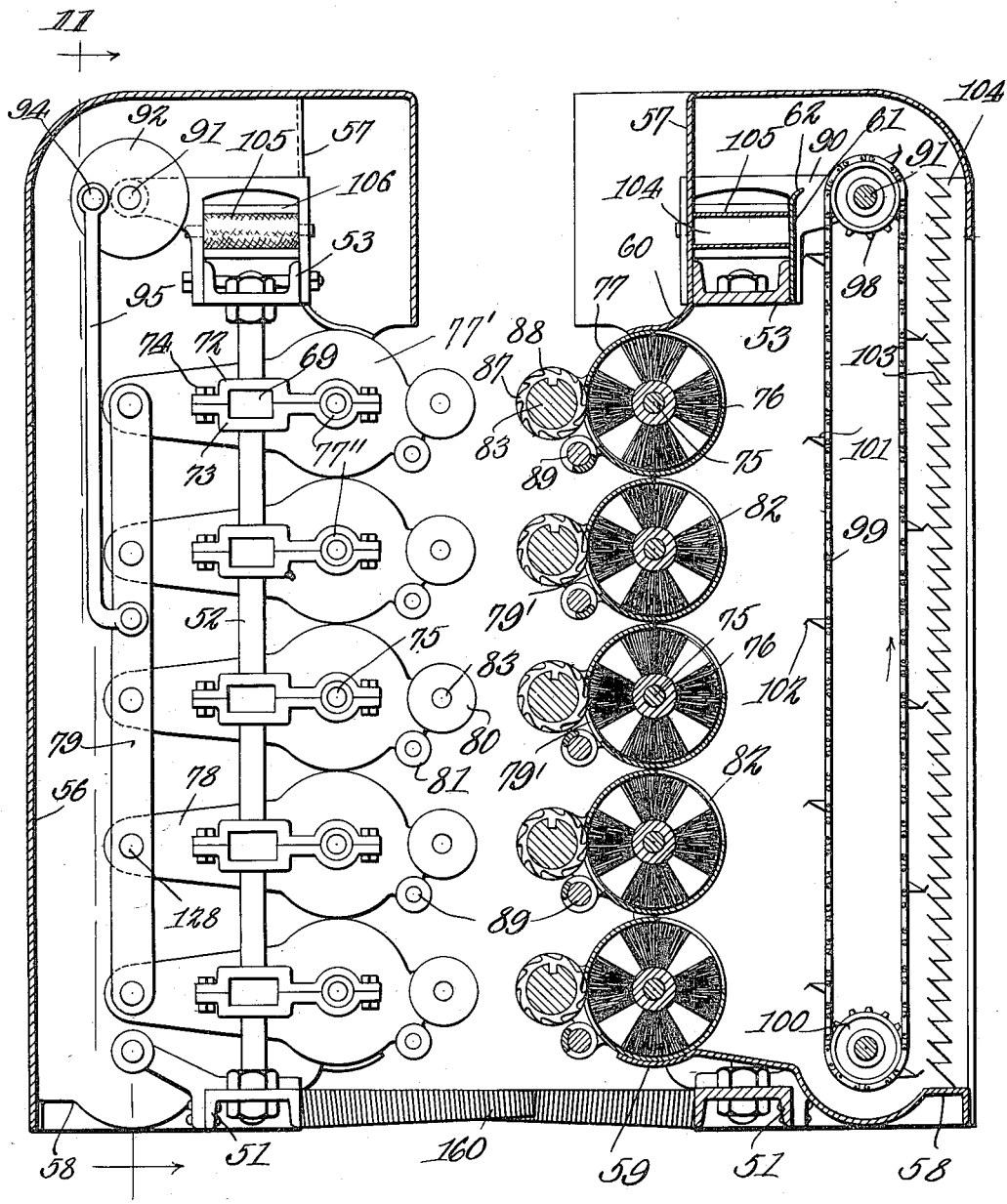
Fig. 10 is a rear elevation of one of the series of picking units, the opposed series being shown in vertical section and the housings of both units being shown in section.

As has heretofore been pointed out, the machine can be drawn forward by means of the tongue 25 or it can, by providing suitable mechanism for that purpose, be driven by its own power. The machine is adapted to straddle a row of plants and by adjusting the opposed housings 56 by the foot levers 67 and the hand wheel 43, the opposed series of picking units and their housings can be held firmly against the sides of the row of plants at any desired angle relative thereto. Furthermore by means of the adjusting screws 32 and the hangers 47, the opposed series of picking units can be pitched to any desired angle longitudinally relative to the ground. As the machine is drawn forwardly motion will be transmitted from the engine to the various parts of the mechanism and the spiral rollers of the various picking units will operate to repel leaves, burs, twigs and other trash and will at the same time push backwardly on the engaged portion of the plants so as to prevent the plants from being pulled forwardly and downwardly by the advancing machine. In other words, these spiral rolls will produce almost the same action on the cotton engaged by the teeth of the rotating picking rolls as is produced when a cotton boll is grasped in one hand and the cotton fiber in the other hand and the two pulled apart. The rapidly rotating picking rolls will engage the cotton fibers and draw them into the tubular housings 77 while the spiral roller 89 will engage the bur and thrust it or repel it away from the picking roll. As has heretofore been explained, the fibers of the cotton boll will enter the spaces at the sides of the teeth 88 thus insuring engagement of the fibers by the teeth. The interposed disks 84, however, will hold the leaves, twigs, burs, etc., out of engagement with the teeth 88. Consequently, very little trash will be carried into the tubular members 77 by the picking rolls. By providing the annular grooves 86 in the disks 84, it is possible for the hulls to press up into the grooves and thus insure engagement of the cotton fibers by the toothed disks. The cotton directed into the tubular members 77 will be doffed from the picking rolls by the brushes 76 and these brushes will throw the cotton violently back into the housing 56 between the chains 99 and onto the teeth 103 where it will hang. As the elevator made up of the chains 99 and the parts attached thereto is traveling in the direction indicated for example in Fig. 10, the spurs on the cleats 101 will engage the cotton and carry it upwardly off of the teeth 103 and as the spurs 102 pass over the shaft 91 the cotton which is in practically a continuous unbroken bat, will gravitate from the spurs and onto the horizontal conveyer 105. This conveyer will carry the cotton forwardly to the inlet ends of the flexible tubes 157 where the suction will carry the cotton outwardly and deliver it from the outlet tube 158. During the picking of the cotton the picking units will be rocked about the shafts 75 because of the reciprocation of the connecting bars 79.

Figure 2:
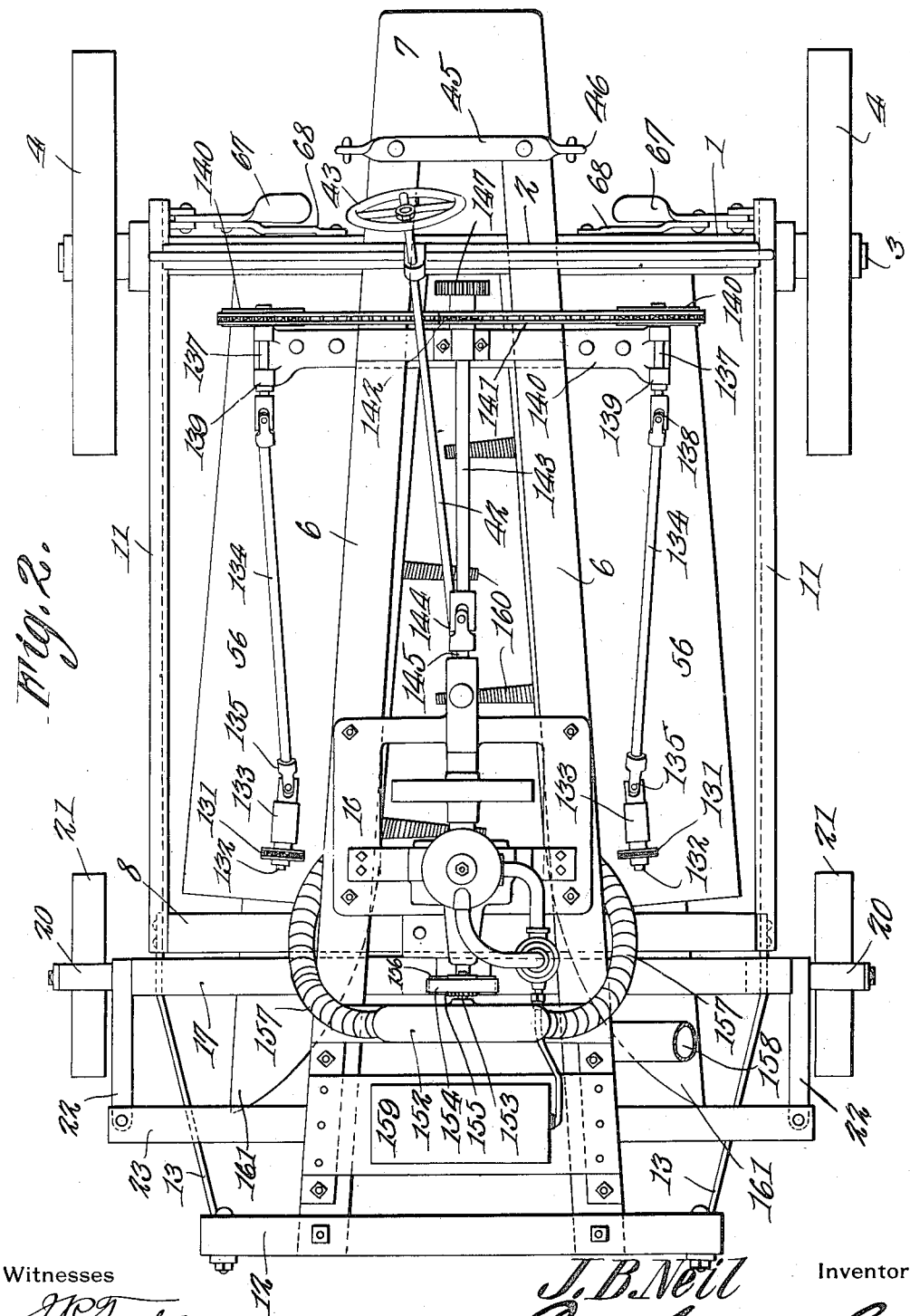
Fig. 2 is a plan view thereof.
Figure 3:
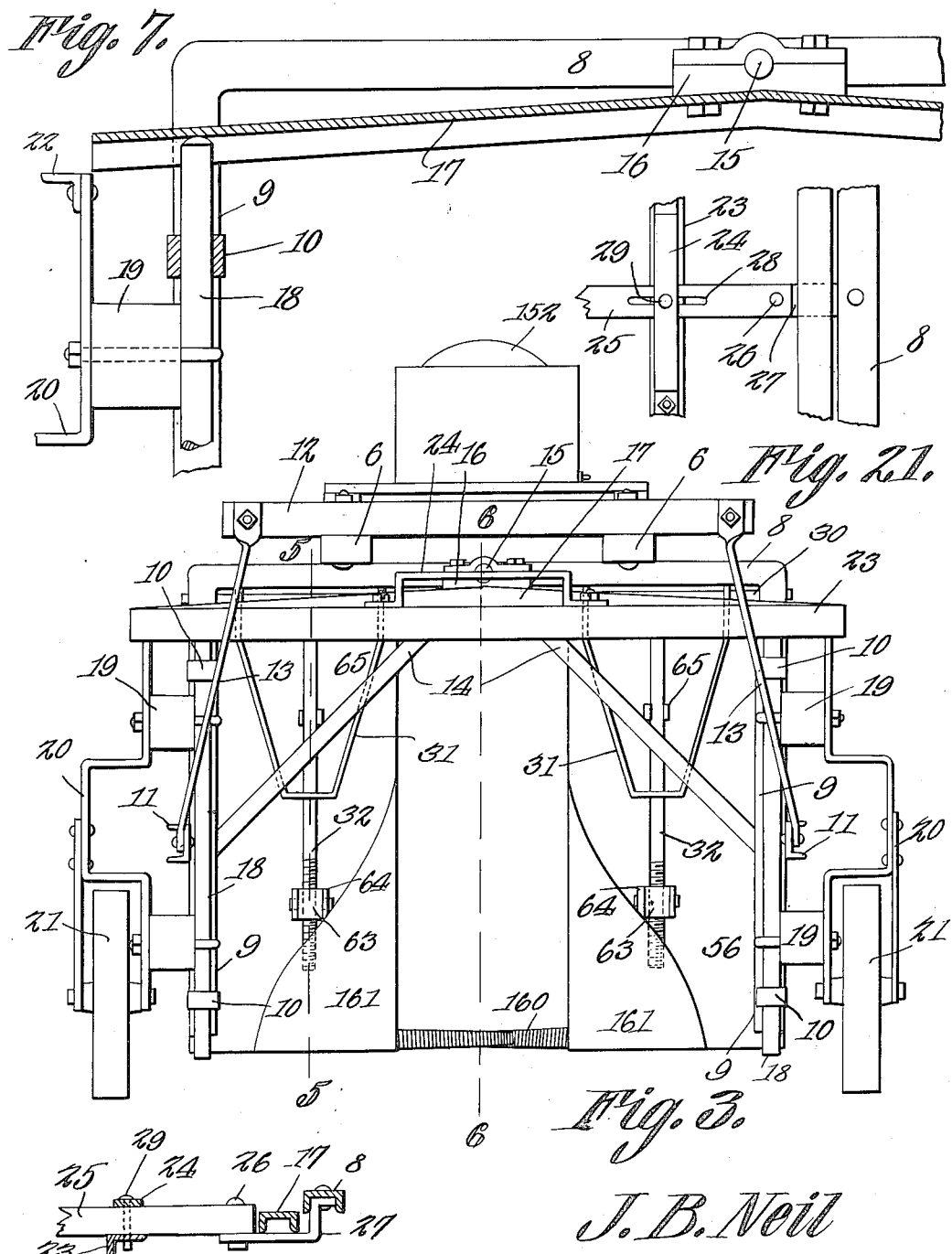
Fig. 3 is a front elevation.

If desired, and as shown in Figs. 1, 2 and 3, fenders 161 may be extended forwardly from the housings 56, these fenders diverging forwardly and serving to gather the plants into the space between the housings.

Instead of using endless conveyers for the purpose of elevating the cotton when delivered from the picking units and instead of employing the horizontal conveyers for conducting the cotton from the elevators to suction flues, a modified structure such as shown in Figs. 18 and 19 may be utilized. By referring to these figures it will be noted that the outer wall of each of the housings 56' is made of a foraminous material indicated at 162 and arranged upon the inner surface of this wall are upwardly extending bars 163 having teeth 164 on which are arranged upwardly and inwardly inclined spurs 165. The foraminous wall 162 does not extend to the top of the housing 56' but, instead, an outlet space 166 is provided within the housing and above said wall 162 and the bars 163. Certain of the arms 78' of the picking units are connected by horizontal rods 167 and mounted on these rods is a frame made up of side bars 168 and cross bars 169. On each of the cross bars is arranged an inclined plate 170 extending throughout the length of the picking unit and provided at its lower end with teeth 171 lying close to the spurs 165. An apron 172 is supported by a cross bar 173 connected to the lower ends of the bars 168 and is attached along one edge to the bottom beam 51. This apron extends close to the spurs 165. It therefore serves to prevent cotton from escaping downwardly through the open bottom of the housing 56'.

Arranged outside of the upper portion of the foraminous wall 162 is a hopper-like pocket 174 into which material directed through the space 166 is adapted to fall.

A suction flue 175 extends into the pocket 174 and has its open end close to the bottom of the pocket. This flue extends to a suction element of any preferred construction so that when cotton is deposited in the pocket 174 it is carried upwardly and outwardly through the flue 175.

By providing a mechanism such as shown in Figs. 18 and 19, the doffed cotton when thrown back into the housings 56' by the doffing brushes will pass between the bars 168 and over the plates 170, some of the cotton becoming hung on the teeth 171 while other cotton will become hung on the spurs 165. During the oscillation of the arms 78' the bars 168 and 169 will be reciprocated upwardly and downwardly and the teeth 171 will engage the cotton hung on the spurs 165 and lift it with a step-by-step movement until it is ultimately discharged over the upper ends of the bars 163 and the wall 162 and directed into the pocket 174. Should any trash be mixed with the cotton, the same will be beaten against the foraminous wall 162 when the cotton is thrown in the direction thereof by the doffing brushes and small particles of leaves, etc., will escape through the openings in the foraminous wall 162.

While the machine herein described is to be drawn over the field, it is to be understood that if desired the machine can be constructed to travel under its own power, in which event special steering means must be provided. For example, and as shown in Fig. 26, one of the spindles 18' corresponding with a spindle 18 can be extended upwardly through the bar 17' and can be formed with a collar 176 constituting a bearing or support for the bar 17'. To the upper end of this spindle may be attached a steering lever 177 adapted to be operated by the driver. Power may be transmitted to the ground engaging wheels in any manner desired from the motor carried by the machine.

Instead of utilizing a doffing brush such as heretofore described, each of the doffing elements can be made up of a cylindrical core 178 on which is spirally wrapped a tape 179 having a plurality of eyelets 180 through which extends tacks 181 the heads of which are held upon the periphery of the core by the tape. As the heads of the teeth formed by the tacks are held to the core by the fabric tape, it will be obvious that each of the teeth will be free to swing to a limited extent relative to the core and thus while each tooth is formed of metal, it is free to yield to a certain extent and will operate to yield approximately in the same manner as the bristles of a brush.

As has heretofore been pointed out, the picker roll in the present structure has been shown arranged above the spiral roll. This arrangement of parts has been found to be advantageous because as the teeth of the picker roll move downwardly and inwardly during the advancing of the machine along the row, the cotton is spread into the paths of the teeth and as the rolls are inclined downwardly toward the rear, the cotton will rise into the paths of the teeth and insure the gripping of the fibers by the teeth. It has been found that in this way is overcome the tendency of the burs to spring upwardly away from the picking rolls when said rolls are arranged above the spiral rolls. As a matter of fact it has been found in actual tests that by arranging the picking roll above the spiral roll so that when the bolls spring upwardly they will move against the downwardly depending teeth of the picking roll, the efficiency of the machine has been greatly increased.

What is claimed is:—

1. A cotton picker including a housing having an open side, flanges extending from the upper and lower portions of the open side, superposed series of cylindrical tubular members mounted in the open side of the housing and disposed close together, the upper and lower members of the series being contacted by the respective flanges, a doffing element mounted within each of the tubular members, means for simultaneously rotating the tubular members, and picking elements movable with said tubular members and supported therebeyond, said tubular members having inlet openings in the outer portions thereof and outlet openings in communication with the interior of the housing.

2. In a cotton picker, upper and lower beams, parallel rods connecting the beams, spaced bearings mounted on the rods and adjustable angularly thereon for self alinement, shafts supported by the bearings, and a picking unit mounted to rock on and adapted to be driven by each of said shafts.

3. In a cotton picker, upper and lower beams, rods connecting the beams to form a rigid frame, bearings supported by the rods and adjustable angularly thereon for self alinement, shafts journaled in the bearings, a picking unit mounted to rock on each shaft and including a doffing brush and a picking roll, and means for actuating each shaft to rotate the brush and picking roll.

4. In a cotton picker, the combination with a wheel supported structure, of spaced housings, means for independently adjusting the housings vertically, and resilient means for holding the rear ends of the housings normally drawn toward each other.

5. In a cotton picker, the combination with a wheel supported structure, of housings, hangers connected to and movable transversely relative to the structure, connections between the hangers and the housings, and means for simultaneously shifting the hangers toward or from each other to correspondingly move the housings at one end and relative to said structure.

6. In a cotton picker, the combination with a wheel supported structure, of housings, picking units therein, swinging supports for one end of the housings, hangers supported by said structure, connections between the hangers and the other ends of the housings, and means for simultaneously shifting the hangers toward and from each other to correspondingly move the housings at one end.

7. In a cotton picker, the combination with a wheel supported structure, of housings, picking units therein, swinging supports for one end of the housings, hangers supported by said structures, connections between the hangers and the other ends of the housings, means for simultaneously shifting the hangers toward or from each other to correspondingly move the housings at one end, and resilient means connected to the other ends of the housings for holding said ends normally drawn toward each other.

8. In a cotton picker, the combination with a wheel supported structure, of housings, picking units therein, swinging supports for one end of the housings, hangers supported by said structure, connections between the hangers and the other ends of the housings, means for simultaneously shifting the hangers toward or from each other to correspondingly move the housings at one end, resilient means connected to the other ends of the housings for holding said ends normally drawn toward each other, and foot operated means for shifting said spring held ends of the housings outwardly against the action of their springs.

9. In a cotton picker, the combination with a wheel supported structure and spaced housings having picking units, of a transverse guide connected to the structure, hangers slidable thereon, connections between the hangers and the front ends of the housings, swinging connections between the structure and the rear ends of the housings, endless chains connected to the respective hangers, means within reach of the operator for simultaneously shifting the chains to move the hangers toward or from each other, and means within reach of said operator for independently shifting the rear ends of the housings laterally.

10. In a cotton picker, the combination with a wheel supported structure and spaced housings having picking units, of a transverse guide connected to the structure, hangers slidable thereon, connections between the hangers and the front ends of the housings, swinging connections between the structure and the rear ends of the housings, endless chains connected to the respective hangers, means within reach of the operator for simultaneously shifting the chains to move the hangers toward or from each other, means within reach of said operator for independently shifting the rear ends of the housings laterally, and resilient means for holding the rear ends of the housings normally drawn toward each other.

11. In a cotton picker, a picking roll including a shaft, disks having radial grooves in opposed faces thereof and toothed rings interposed between the disks, the teeth being interposed between the radial grooves in the opposed disks, the diameters of the disks and rings being equal.

12. In a cotton picker, a picking roll including a shaft, disks having radial grooves in opposed faces thereof and toothed rings interposed between the disks, the teeth being interposed between the radial grooves in the opposed disks, the diameters of the disks and rings being equal, each disk having an annular groove.

13. In a cotton picker, a frame including a lower beam, an upper channel beam, and connections between the beams, picking units supported by the frame and including doffing means, a housing connected to the frame and adapted to receive cotton from the doffing means, an endless conveyer mounted within the channel beam, means on one wall of the housing for engaging and supporting cotton directed into the housing, and means for elevating cotton from said supporting means and to the conveyer.

14. In a cotton picker, the combination with a frame including a lower beam, an upper channel beam, and connections between the beams, of picking units connected to the frame and including doffing means, a housing attached to the frame for receiving cotton from the doffing means, said housing having a depending portion connected to the channel beam, a plate secured to said beam and coöperating with the beam and depending portion of the housing to form a trough, an endless conveyer within said trough, and means for elevating cotton from the housing and into the trough.

15. In a cotton picker, the combination with a frame including a lower beam, an upper channel beam, and connections between the beams, of picking units connected to the frame and including doffing means, a housing attached to the frame for receiving cotton from the doffing means, said housing having a depending portion connected to the channel beam, a plate secured to said beam and coöperating with the beam and depending portion of the housing to form a trough, means within the housing for engaging and supporting cotton directed into the housing, and elevating means for lifting the cotton from said supporting means and directing it into the trough and onto the conveyer.

16. In a cotton picker, the combination with opposed series of picking units, of flexible means extending toward each other from the respective units for engaging and depressing weeds entering between said units.

17. A cotton picker including superposed picking units each comprising a housing, a doffing element within the housing, a picking roll having its active portion movable downwardly and inwardly toward the housing, a spiral roll mounted for rotation below the picking roll.

18. In a cotton picker, a picking unit including a housing, a picking roll having peripheral teeth movable downwardly and inwardly to engage cotton fibers and direct them into the housing, and a revoluble spiral roll supported below and revoluble with the picking roll.

19. In a cotton picker, a picking unit including a housing, a picking roll having peripheral teeth movable downwardly and inwardly to engage cotton fibers and direct them into the housing, a revoluble spiral roll supported below and revoluble with the picking roll, and a doffing element within the housing.

20. In a cotton picker, a picking unit including a housing, a picking roll having peripheral teeth movable downwardly and inwardly to engage cotton fibers and direct them into the housing, a revoluble spiral roll supported below and revoluble with the picking roll, a doffing element within the housing, and conveying mechanism back of the housing for receiving material discharged from the housing by the doffing element.

21. In a cotton picker, a picking unit including a housing, a picking roll having peripheral teeth movable downwardly and inwardly to engage cotton fibers and direct them into the housing, a revoluble spiral roll supported below and revoluble with the picking roll, and a doffing element within the housing, said doffing element including a core, a flexible strip wrapped about the core, non-flexible teeth extending through the strip and having heads bound by the strip and against the core.

In testimony that I claim the foregoing as my own, I have hereto affixed my signature in the presence of two witnesses.

JOSEPH B. NEIL.

Witnesses:
R. H. DOBSON,
F. E. CLINTON.